US00RE37109E

(19) United States
(12) Reissued Patent
Ganelin

(10) Patent Number: US RE37,109 E
(45) Date of Reissued Patent: Mar. 27, 2001

(54) METHOD OF AND DEVICE FOR PRODUCTION OF HYDROCARBONS

(75) Inventor: Boris Ganelin, Brooklyn, NY (US)

(73) Assignee: Technology Commercialization Corp., New York, NY (US)

(21) Appl. No.: 09/307,218

(22) Filed: May 7, 1999

Related U.S. Patent Documents

Reissue of:
(64) Patent No.: 5,730,220
Issued: Mar. 24, 1998
Appl. No.: 08/755,642
Filed: Nov. 25, 1996

(51) Int. Cl.[7] ..... E21B 43/00
(52) U.S. Cl. ..... 166/372; 166/242.3
(58) Field of Search ..... 166/313, 372, 166/242.1, 242.3

(56) References Cited

U.S. PATENT DOCUMENTS

| | | | | |
|---|---|---|---|---|
| 1,354,027 | * | 9/1920 | Crowell | 166/372 |
| 4,382,470 | * | 5/1983 | Naffziger | 166/242.1 |
| 4,527,956 | | 7/1985 | Baumberg | 417/65 |
| 4,528,919 | | 7/1985 | Harbolt | 111/7 |
| 4,700,783 | * | 10/1987 | Baron | 166/372 |
| 5,105,889 | * | 4/1992 | Misikov et al. | 166/372 |
| 5,227,054 | | 7/1993 | Gyulavari | 210/150 |
| 5,246,070 | * | 9/1993 | Greve et al. | 166/242.3 |
| 5,404,945 | * | 4/1995 | Head et al. | 166/242.3 |
| 5,707,214 | | 1/1998 | Schmidt | 417/109 |
| 5,752,570 | | 5/1998 | Shaposhnikov | 166/372 |
| 5,785,124 | | 6/1998 | Hisaw | 166/372 |
| 5,806,598 | | 9/1998 | Amani | 166/372 |
| 5,871,048 | | 2/1999 | Tokar | 166/263 |

FOREIGN PATENT DOCUMENTS

| | | | |
|---|---|---|---|
| 2304392 | 3/1997 | (GB) | F16L/53/00 |

* cited by examiner

*Primary Examiner*—William Neuder
(74) *Attorney, Agent, or Firm*—Boris Leschinsky

(57) ABSTRACT

During production of hydrocarbons, an oil-gas flow from a well bottom to a well-head is subdivided into a plurality of individual oil-gas flows which flow in a plurality of individual passages located side-by-side with one another.

24 Claims, 5 Drawing Sheets

METHOD OF AND DEVICE FOR PRODUCTION OF HYDROCARBONS

Matter enclosed in heavy brackets [ ] appears in the original patent but forms no part of this reissue specification; matter printed in italics indicates the additions made by reissue.

BACKGROUND OF THE INVENTION

The present invention relates to a method of and a device for production *of* hydrocarbons, such as oil*, natural gas* and the like.

It is known to produce oil [by introducing into it gas so as to form an oil-gas] *or other hydrocarbons in situations where oil or other liquids are combined with natural gas or other gases to form a liquid-gas* fluid which is lifted in a production pipe. The resulting flow is a flow of two interacting phases, a gas phase and a liquid phase. Depending on a diameter of the production pipe, a gas factor or a gas quantity dissolved in a mass unit of liquid, physical characteristics of gas and liquid, speed of the gas phase relative to the liquid phase, an exchange of the motion quantity between the phases and therefore a share of gas phase energy spent for displacement of the liquid phase can substantially change during the process of flowing of the two-phase medium. Due to the changes in the structure of the two-phase flow during the process of flowing and redistribution of energy of the gas phase used for the displacement of the liquid phase and for the displacement of the gas phase itself, it is possible that a corresponding energy share of the gas phase is insufficient for displacement of the liquid phase. This is characteristic for the case when the energy of the gas phase is the only source of energy for displacement of the liquid phase. This case is typical*, for example,* for oil wells when the natural energy of the formation is composed of a potential energy of oil which is *contained* under pressure from rock, ground water, and potential energy of hydrocarbon gas dissolved in oil, which [are ] *is* transferred into the gas phase when the pressure in the fluid becomes lower than the saturation pressure. Oil which is lifted in a well to a certain height by the pressure of rock ground water, *and* gravitational energy, can move further only due to the energy of gas dissolved in oil and transferred to the gas phase at a certain level in the well when the hydrostatic pressure in the oil column becomes lower than the saturation pressure. During movement of the fluid to a well-head with reducing pressure the quantity of gas emerging from oil is increased and the structure of the flow changes. An increase of the gas quantity transferred from the dissolved condition into the gas phase and correspondingly of its speed during movement to the well head leads to the situation that in a portion of the well which adjoins the [well head] *well-head* an annular mode of flow is formed, when the oil forms a film extending along the pipe wall while a gas nucleus contains liquid drops. Therefore only a small fraction of the gas phase energy is used for displacement of the liquid to the well-head and practically the well yield is equal substantially *to* zero. The evolution of the flow structure in the well is such that during the movement of fluid to the well-head the pressure and quantity of gas [emerge] *emerging* from the liquid is reduced and the speed of the gas phase relative to the liquid is increased. As a result the liquid and gas phase have a tendency to separate from one another. During this process a corresponding fraction of the gas phase energy used for the displacement of liquid to the well-head is reduced.

When the well is in the annular mode, its efficiency coefficient or in other words a ratio of the gas phase energy actually used for the liquid displacement to all energy of the gas phase which can be used for the liquid displacement, reduces substantially *to* zero. Even when the well operates in a fountain mode, the efficiency coefficient can not be high since the structure of the flow near the well-head #is such that the gas phase occupies the main [fraction] *portion* of the space *available* for the fluid flow and the quantity of the entrained liquid is relatively low. The low efficiency coefficient leads to an accelerated degasification of formation and as a result to a conversion of the well to a mechanized [expansive] *expensive* production method.

SUMMARY OF THE INVENTION

Accordingly, it is an object of the present invention to provide a method of and a device for production of hydrocarbons which avoids the disadvantages of the prior art.

More particularly, it is an object of the present invention to provide a method of and a device for production of hydrocarbons, in which the efficiency of use of the gas phase energy for displacement of [oil] *liquid* in [gas-oil] *liquid-gas* flows is substantially increased. *The invention has particular utility in production of such hydrocarbons as oil and natural gas.*

In keeping with these objects and with others which will become apparent hereinafter, one feature of the present invention resides, briefly stated, in a method of producing hydrocarbons, in accordance with which an [oil-gas] *liquid-gas* flow is subdivided in a direction which is transverse to a direction of movement of the [oil-gas] *liquid-gas* flow, into a plurality of individual flows which flow simultaneously and side by side in the direction of movement.

It is another feature of the present invention to provide a device for production of hydrocarbons which has means for confining [an oil-gas] *a liquid-gas* flow; and means for subdividing the [oil-gas] *liquid-gas two-phase* flow in a transverse direction into a plurality of individual [oil-gas] *two-phase* flows which flow simultaneously side by side in direction of movement of the [oil-gas] *liquid-gas* flow.

When the method is performed and the device is designed in accordance with the present invention, the efficiency of the gas phase for displacement of the [oil] *liquid* phase is substantially increased, the operation and maintenance of well is simplified, the cost of production of the formation hydrocarbons is reduced and the efficiency is increased, and accelerated degasification of the formation is prevented.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
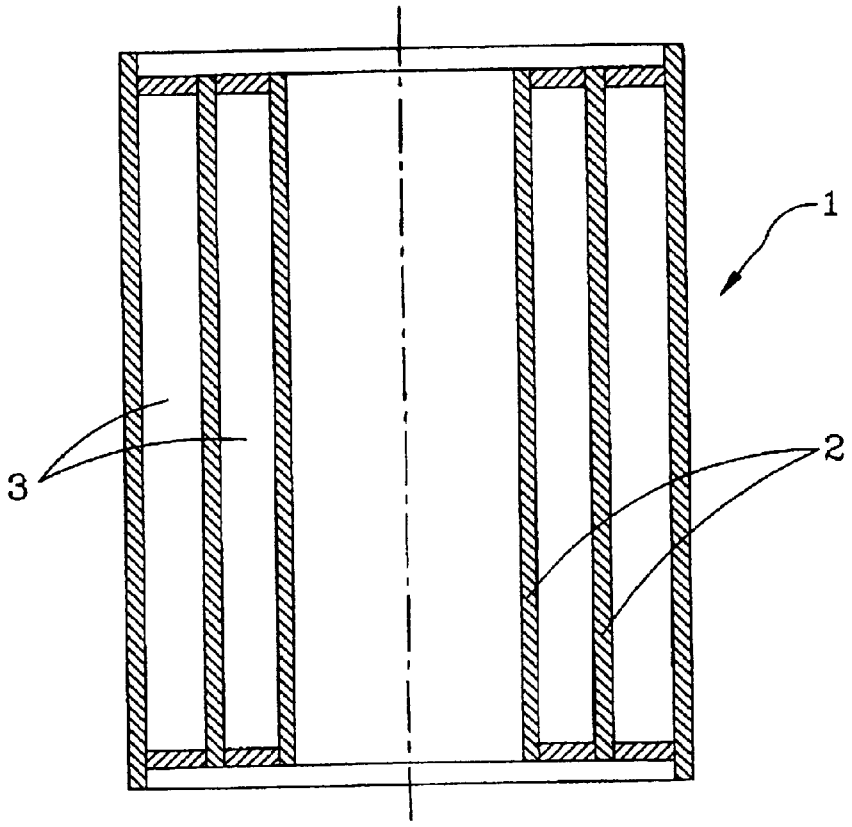
FIGS. 1 and 2 are views showing a transverse and a longitudinal cross-section of a device for production of hydrocarbons in accordance with the present invention.
Figure 2:
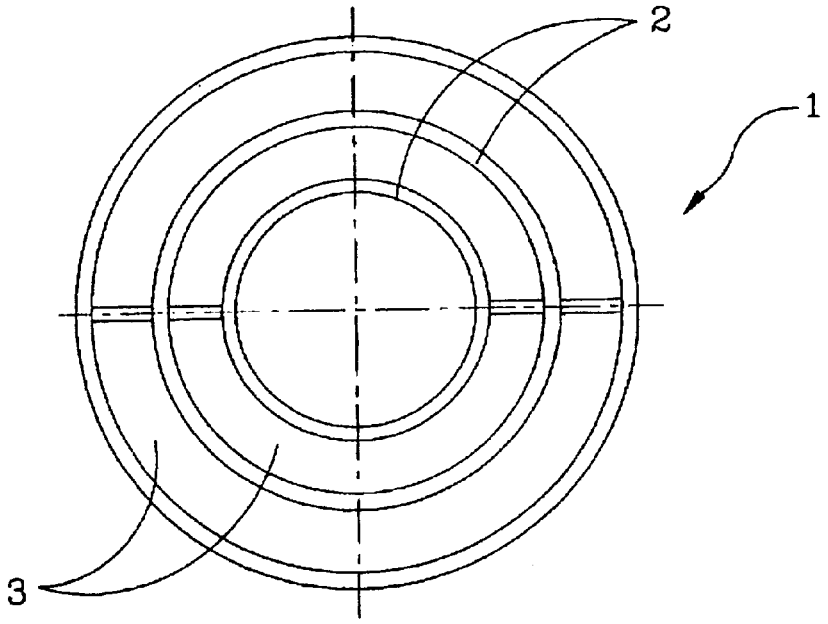

In accordance with one embodiment shown in FIGS. 1 and 2, an inventive device for production of hydrocarbons in accordance with an inventive method includes a production pipe identified with reference numeral 1. A plurality of elements 2 are provided to subdivide a transverse cross-section of the production pipe 1 into a plurality of individual passages 3. In the embodiment of FIGS. 1–2 the elements 2 which subdivide the cross-section of the production pipe into a plurality of passages 3 are formed as concentric walls, so that the passages 3 are concentric passages. Therefore a plurality of individual [oil-gas] *liquid-gas* flows flow through the individual concentric passages 3 in the movement direction of the [oil-gas] *two-phase* flow. The size of each of the individual passages 3 is selected so as to provide a desired structure of the [oil-gas] *liquid-gas* individual flow, to obtain a maximum efficiency of use of the gas phase energy as a source of energy for displacement of the [oil] *liquid* phase. *The liquid phase may contain oil as well as other liquids present in the well such as water, condensate, and alike. Further description generally refers to the liquid phase as an "oil phase" but it should be understood to include other liquids described above.*

The oil phase obtains the movement quantity from the gas phase in increasing value with the increase of intensity of the movement quantity exchanged between the phases, or the increase of resistance to movement of the gas phase relative to the oil phase. With the same cross-section of the production pipe, this can be obtained by [increase by] *increasing* the axial speed in the individual passage V in the radial direction R and the increase of sheer stresses $\tau$.

$$\tau=\mu dV/dR$$

wherein $\mu$ is a dynamic viscosity of the oil; with the increase of an inner surface area of the passage.

Figure 3:
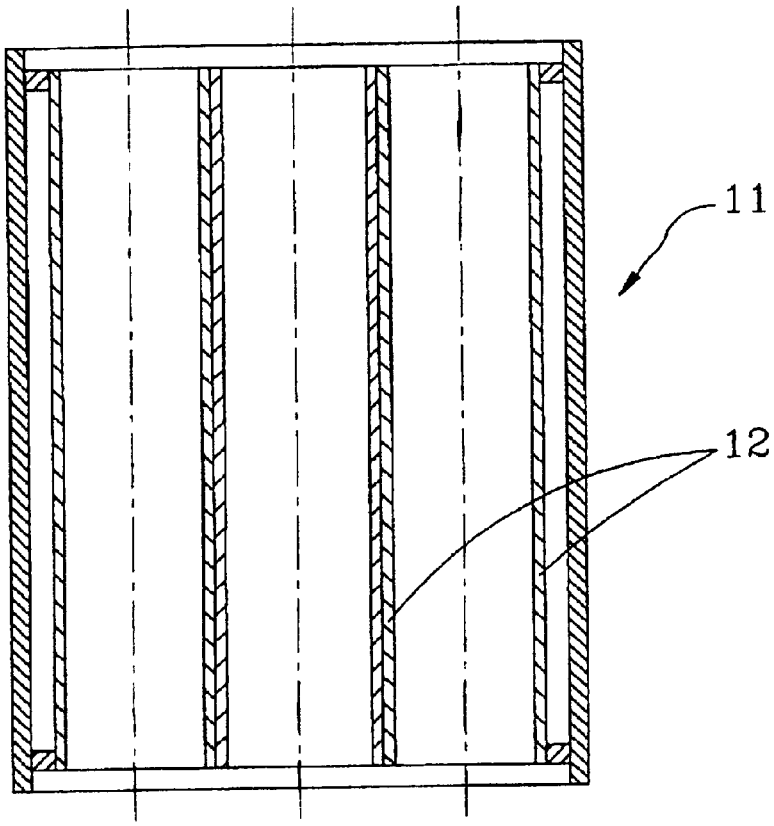
FIGS. 3 and 4 are views showing a transverse and a longitudinal cross-section of the inventive device in accordance with another embodiment of the present invention.
Figure 4:
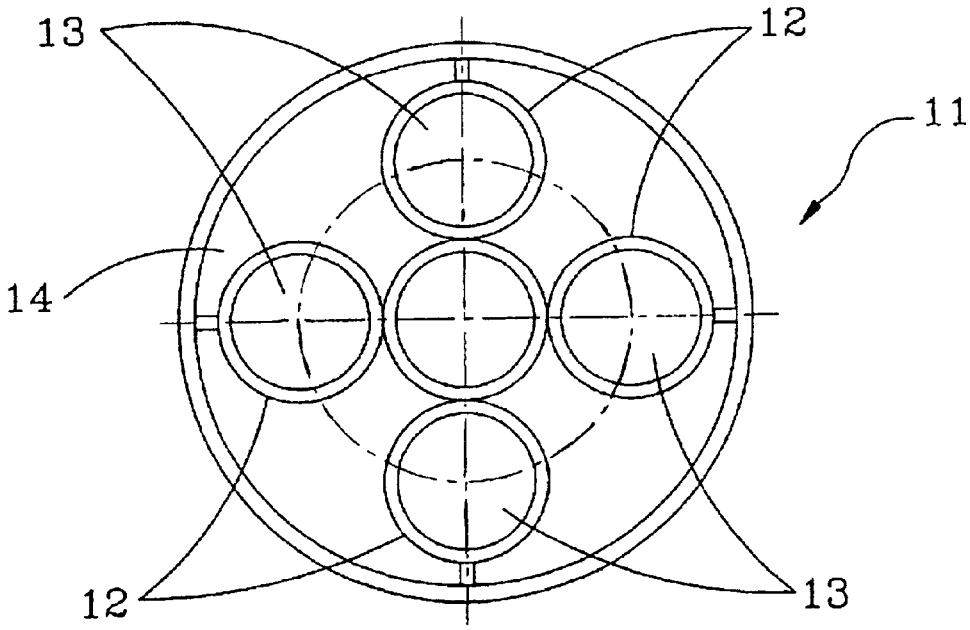
Figure 5:
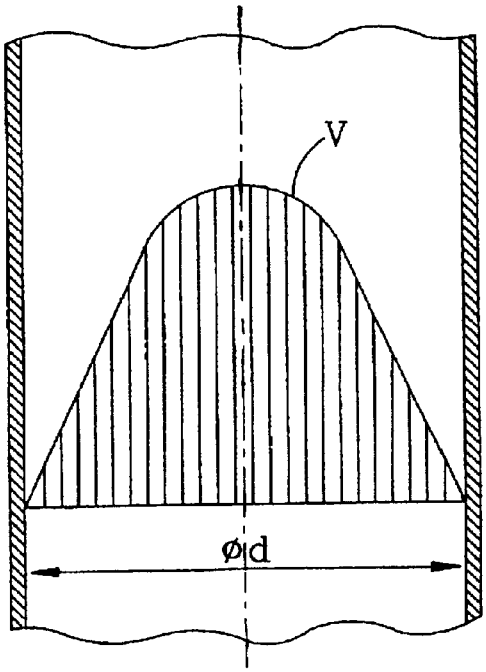
FIGS. 5 and 6 are views showing a change in a kinematics of [oil-gas] *a liquid-gas* flow in a device in accordance with the prior art and in a device in accordance with *the* present invention.
Figure 6:
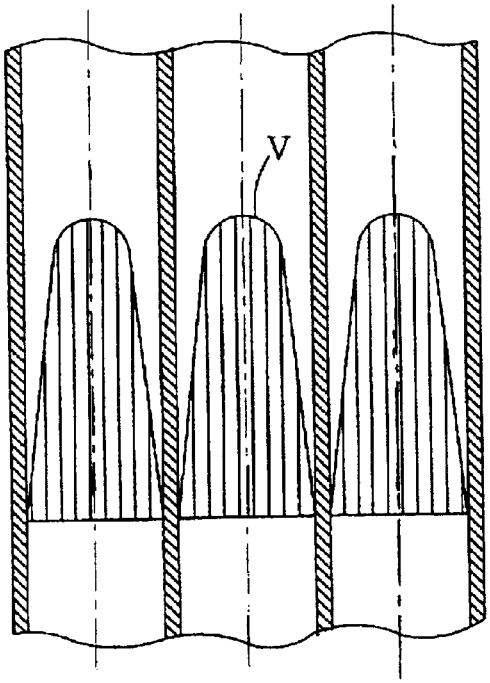

In accordance with a second embodiment of the present invention shown in FIGS. 3 and 4, an interior *space* of the production pipe 11 is subdivided by a plurality of walls 12 into a plurality of individual passages 13 extending side-by-side *with* one another [with] so that simultaneously individual oil-gas flows flow inside the passages 13. Also, an individual oil-gas flow can flow outside the individual passages 13 in a space 14.

Figure 7:
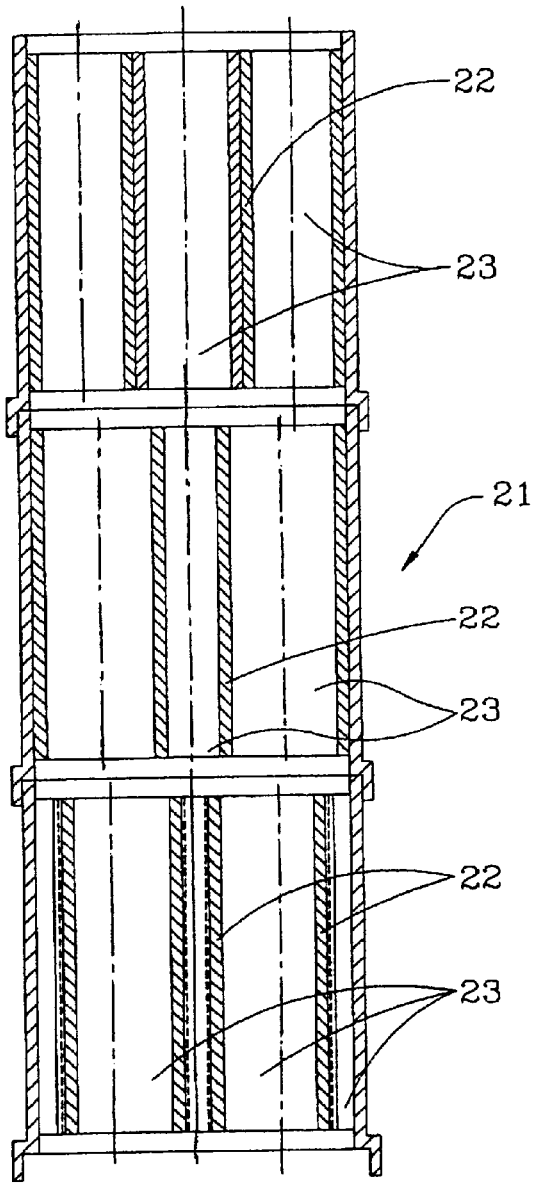
FIGS. 7 and 8 are views illustrating another embodiment of the present invention.
Figure 8:
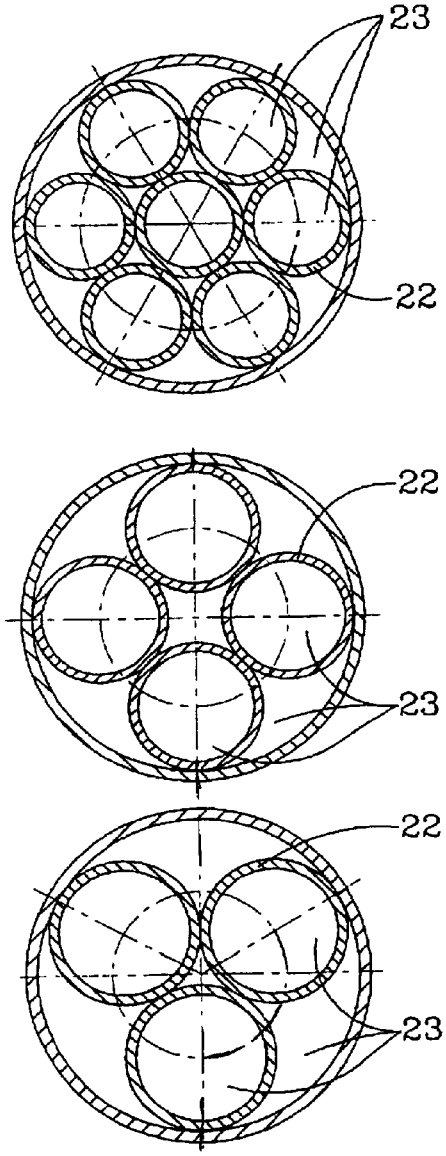

As shown in FIGS. 7 and 8 in accordance with a further embodiment of the present invention, [shown in FIG. 7*a*] geometrical size of the individual passages 23 can change in direction [of flow] of the oil-gas flow, and [also] a number of passages can also change in direction [flow] of the oil-gas flow. The construction shown in FIGS. 7 and 8 is also selected so as to provide a maximum use of the gas phase energy for displacement of the oil phase.

Figure 9:
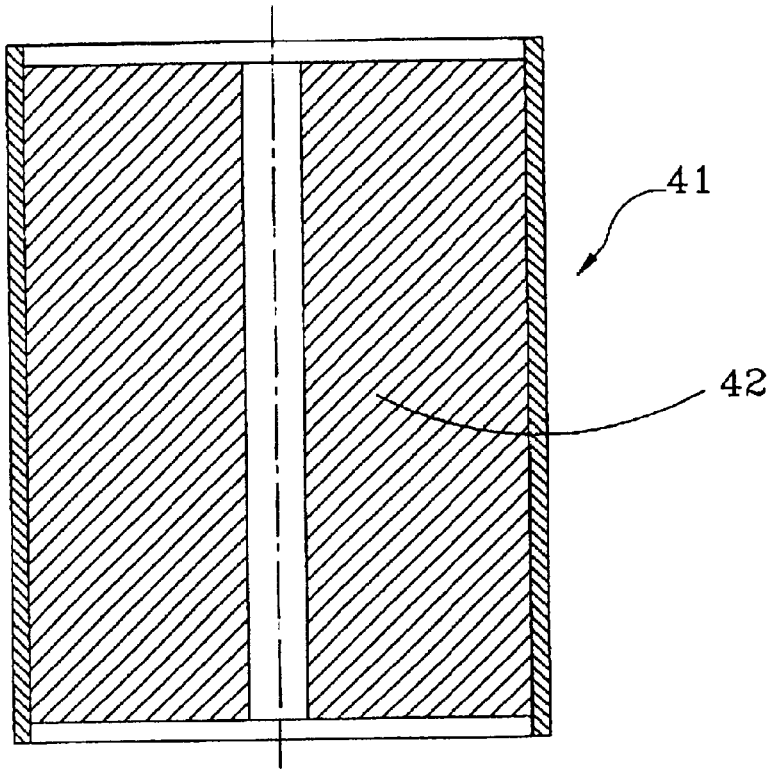
FIGS. 9 and 10 are views showing a transverse and a longitudinal cross-section of the device in accordance with a still further embodiment *of the present invention*.
Figure 10:
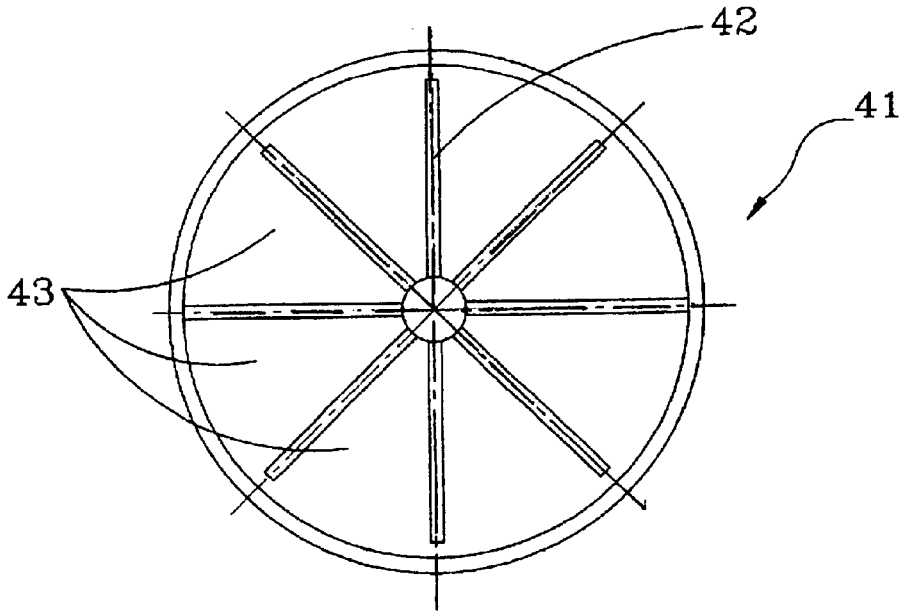

In the embodiment shown in FIGS. 9 and 10 the production pipe 41 is subdivided by a star-like insert into a plurality of individual [segment-shared] *sector-shaped* passages 43 extending side-by-side with one another.

As can be seen from the drawings, the production pipe in accordance with the present invention is formed of a plurality of vertical sections, each formed in accordance with the present invention (one of its embodiments) and connected with one another by known connecting means which are not shown in the drawings. The same production pipe can be also [compsed] *composed* of sections formed in accordance with different [embodimenents] *embodiments* and also connected with one another.

It will be understood that each of the elements described above, or two or more together, may also find a useful application in other types of methods and constructions differing from the types described above*, such as in production of natural gas*.

While the invention has been illustrated and described as embodied in method of and device for production of hydrocarbons, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A method of production of hydrocarbons, comprising the steps of introducing into an oil well a production pipe having an inlet to be located substantially in a region of a well bottom and an outlet to be located substantially in a region of a well head, so that an oil-gas mixture flow flows from the inlet to the outlet of the production pipe; and increasing in the production pipe a resistance to movement of a gas phase relative to an oil phase of the oil-gas mixture by subdividing at least a portion of the production pipe into a plurality of passages each having a cross-section which is a fraction of a cross-section of the production pipe and extending in a direction from the inlet to the outlet of the production pipe so as to subdivide said oil-gas mixture flow into a plurality of individual oil-gas mixture flows which have a fraction of a cross-section of said oil-gas mixture and flow simultaneously in a direction from the inlet to the outlet of the production pipe.

2. A method as defined in claim 1, wherein said subdividing includes forming a plurality of individual passages which extend concentrically with one another in a direction from the inlet to the outlet of the production pipe, so that the individual oil-gas flows simultaneously flow through the individual concentric passages.

3. A method as defined in claim 1, wherein said subdividing includes forming a plurality of passages which extend substantially parallel and [side by side] *side-by-side* with one another in a direction from the inlet to the outlet of the production pipe, so that the individual oil-gas flows flow simultaneously through the side-by-side passages.

4. A method as defined in claim 1, wherein said subdividing includes forming a plurality of individual passages through which the individual oil-gas flows flow simultaneously in a direction from the inlet to the outlet of the production pipe; and changing a geometry of the individual passages in direction of movement of the individual oil-gas flows.

5. A method as defined in claim 1, wherein said subdividing includes forming a plurality of passages located side by side with one another through which the individual oil-gas flows flow simultaneously in a direction from the inlet to the outlet of the production pipe so that a number of passages in a direction of flow of the oil-gas mixture changes at different heights of the production pipe.

6. A device for production of hydrocarbons, comprising a production pipe to be introduced into an oil well and having an inlet to be located in a region of a well bottom and an outlet to be located in a region of a [valve] *well* head, so that an oil-gas mixture flow flows from the inlet to the outlet of the production pipe; and means for increasing in said production pipe a resistance to movement of a gas phase relative to an oil phase of the oil-gas mixture, said increasing means include means for subdividing at least a portion of said production pipe into a plurality of passages having a reduced cross-section which is a fraction of a cross-section of said production pipe and extending from said inlet to said outlet of said production pipe, so as to subdivide said oil-gas mixture flow into a plurality of individual oil-gas mixture flows which have a fraction of a cross section of said oil-gas mixture and flow through said passages of said reduced cross-section simultaneously in a direction from said inlet to said outlet of said production pipe.

7. A device as defined in claim 6, wherein said individual passages extend concentrically with one another.

8. A device as defined in claim 6, wherein said individual passages extend substantially parallel to one another.

9. A device as defined in claim 6, wherein said individual passages have a geometry which changes in a direction of flow of the oil-gas.

10. A device as defined in claim 6, wherein a number of the individual passages changes in a direction of flow of the individual oil-gas flows.

*11. The method as in claim 3, wherein said step of subdividing further including using a star-like insert, said insert subdividing at least a portion of said production pipe into a plurality of sector-shaped passages.*

*12. The device as in claim 8, wherein said means for subdividing further comprising a star-like insert for subdividing at least a portion of said production pipe into a plurality of sector-shaped passages.*

*13. A method of production of hydrocarbons, comprising the steps of introducing into a well a production pipe having an inlet to be located substantially in a region of a well bottom and an outlet to be located substantially in a region of a well head, so that a liquid-gas mixture flow flows from the inlet to the outlet of the production pipe; and increasing in the production pipe a resistance to movement of a gas phase relative to a liquid phase of the liquid-gas mixture by subdividing at least a portion of the production pipe into a plurality of passages each having a cross-section area which is a fraction of a cross-section area of the production pipe and extending in a direction from the inlet to the outlet of the production pipe so as to subdivide said liquid-gas mixture flow into a plurality of individual liquid-gas mixture flows which have a fraction of a cross-section area of said liquid-gas mixture flow, said individual flows moving simultaneously in the direction from the inlet to the outlet of the production pipe.*

*14. The method as in claim 13, wherein said subdividing includes forming a plurality of individual passages which extend concentrically with one another in the direction from the inlet to the outlet of the production pipe, so that the individual liquid-gas flows simultaneously flow through the individual concentric passages.*

*15. The method as in claim 13, wherein said subdividing includes forming a plurality of individual passages through which the individual liquid-gas flows flow simultaneously in the direction from the inlet to the outlet of the production pipe; and changing the geometry of the individual passages in the direction of movement of the individual liquid-gas flows.*

*16. The method as in claim 13, wherein said subdividing includes forming a plurality of passages which extend substantially parallel and side-by-side with one another in the direction from the inlet to the outlet of the production pipe, so that the individual liquid-gas flows flow simultaneously through the side-by-side passages.*

*17. The method as in claim 13, wherein said subdividing includes forming a plurality of passages located side-by-side with one another through which the individual liquid-gas flows flow simultaneously in the direction from the inlet to the outlet of the production pipe so that the number of passages in the direction of flow of the liquid-gas mixture changes at different heights of the production pipe.*

*18. The method as in claim 16, wherein said step of subdividing further including using a star-like insert, said insert subdividing at least a portion of said production pipe into a plurality of sector-shaped passages.*

*19. A device for production of hydrocarbons comprising a production pipe to be introduced into a well and having an inlet to be located in a region of a well bottom and an outlet to be located in a region of a well head, so that a liquid-gas mixture flow flows from the inlet to the outlet of the production pipe; and means for increasing in said production pipe a resistance to movement of a gas phase relative to a liquid phase of the liquid-gas mixture, said means for increasing include means for subdividing at least a portion of said production pipe into a plurality of passages having a reduced cross-section area which is a fraction of a cross-section area of said production pipe and extending from said inlet to said outlet of said production pipe, so as to subdivide said liquid-gas mixture flow into a plurality of individual liquid-gas mixture flows which have a fraction of a cross section area of said liquid-gas mixture and flow through said passages of said reduced cross-section area simultaneously in a direction from said inlet to said outlet of said production pipe.*

*20. The device as in claim 19, wherein said individual passages extend concentrically with one another.*

*21. The device as in claim 19, wherein said individual passages extend substantially parallel to one another.*

*22. The device as in claim 19, wherein said individual passages have a geometry which changes in the direction of flow of the individual liquid-gas flows.*

*23. The device as in claim 19, wherein a number of the individual passages changes in the direction of flow of the individual liquid-gas flows.*

*24. The device as in claim 21, wherein said means for subdividing further comprising a star-like insert for subdividing at least a portion of said production pipe into a plurality of sector-shaped passages.*

* * * * *